United States Patent [19]

Jordan

[11] 4,273,302
[45] Jun. 16, 1981

[54] AIRCRAFT WITH COUNTERROTATING MEMBERS

[75] Inventor: Heinz Jordan, Woelfnitz, Austria

[73] Assignee: Technische Geräte -u. Entwicklungsgesellschaft m.b.H, Woelfnitz/Klagenfurt, Austria

[21] Appl. No.: 956,005

[22] Filed: Oct. 30, 1978

[30] Foreign Application Priority Data

Oct. 31, 1977 [AT] Austria ................................. 7749/77
Jun. 13, 1978 [AT] Austria ................................. 4309/78
Jun. 13, 1978 [AT] Austria ................................. 4310/78

[51] Int. Cl.³ .............................................. B64C 39/06
[52] U.S. Cl. .................................. 244/23 C; 244/12.2; 244/73 R
[58] Field of Search ............. 244/12.2, 12.3, 12.5, 244/23 C, 23 A, 23 B, 23 D, 73 B, 73 C

[56] References Cited

U.S. PATENT DOCUMENTS

| | | | |
|---|---|---|---|
| 3,034,747 | 5/1962 | Lent | 244/73 C |
| 3,096,044 | 7/1963 | Gould | 244/12.2 |
| 3,104,853 | 9/1963 | Klein | 244/73 B |
| 3,394,906 | 7/1968 | Rogers | 244/23 C |
| 3,525,484 | 8/1970 | Mueller | 244/12.2 |
| 3,677,503 | 7/1972 | Freeman | 244/23 C |

Primary Examiner—Charles E. Frankfort
Attorney, Agent, or Firm—Beveridge, DeGrandi, Kline & Lunsford

[57] ABSTRACT

A rotationally symmetrical supporting member provides lift in response to movement of air over its upper surface, and such air movement is produced by the impeller of a coaxially arranged drive unit, the base of which is connected to the supporting member so that counter torque from the drive unit imparts rotational movement to the supporting member. A carrier which may hold a load or supporting steering flaps is rotatably mounted in relation to the supporting means and to the driving unit.

1 Claim, 11 Drawing Figures

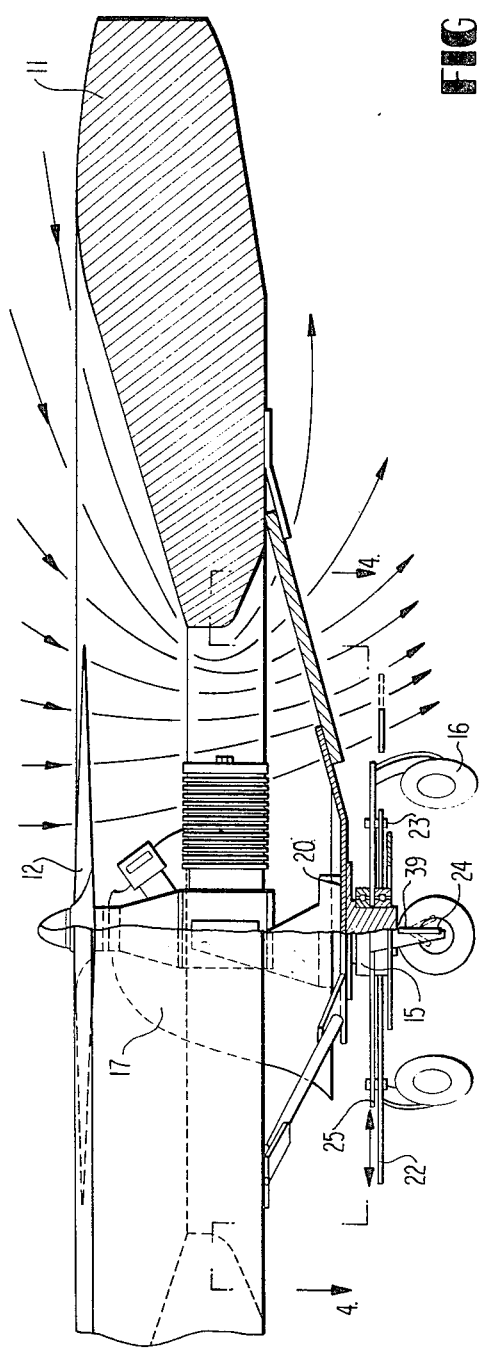
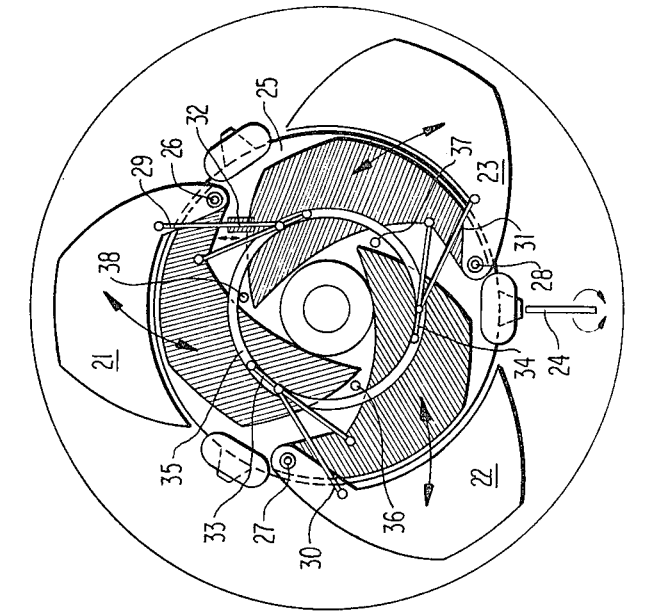
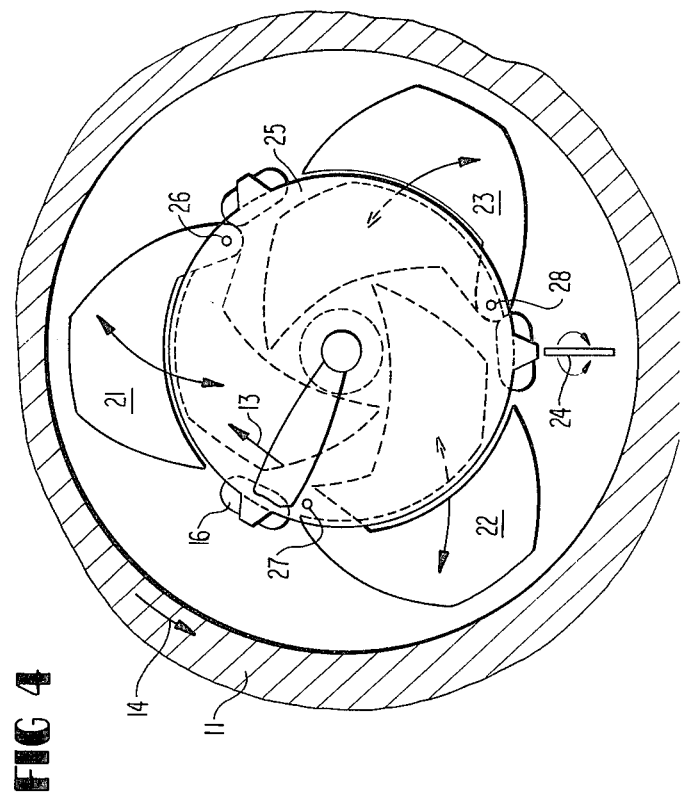
FIG 3
FIG 5
FIG 4

AIRCRAFT WITH COUNTERROTATING MEMBERS

The invention relates to a disk-shaped flying craft having an outer supporting means presenting rotation symmetry, a rotatably mounted driving unit such as a propeller, turbine or the like coaxially arranged within the supporting means and a steering means and/or a cabin for receiving loads.

In a known flying craft of this type, the outer supporting means is disk- or mushroom-shaped and provided on its circumference with air slots or baffles in order to introduce a rotational movement of the entire flying craft running counter to the rotation of the turbine. Further, air flows from the upper surface of the flying craft through slots and jets to its lower surface. This results in major frictional losses. Moreover, the steering system is elaborate. (German Offenlegungsschrift No. 1 556 399).

Another known flying craft comprises a rotatable disk driven by a driving unit which is coaxially arranged, but remains stationary in air space during the flight. The corotation of the driving unit and the cabin rigidly connected to it is prevented by baffles arranged within the air stream (Austrian Patent Specification No. 424521).

Also known is a disk-shaped flying craft having the pilot seat arranged in its axis of rotation. The disk-shaped part is supporting means and driving unit all at once, so that this embodiment is limited in its application. (German Offenlegungsschrift No. 1 948 001). This also applies to a still further known embodiment in which the turbine engines are arranged below the disk-shaped part (U.S. Pat. No. 3,537,669).

Object of the invention is to provide a flying craft with very good stability properties and high economy at greatest possible safety.

A second object of the invention is to provide a flying craft with optimal steering properties.

A further object of the invention is to provide a flying craft having a good aerodynamic lift.

The invention comprises in a flying craft of the type initially mentioned the improvement of driving the outer supporting means, which in cross section preferably has the shape of an airfoil profile, in a direction of counter rotation in relation to the direction of rotation of the driving unit itself generating a counter torque, and of arranging the steering means and/or the cabin rotatably in relation to the outer supporting means and the driving unit, particularly by means of a shaft supported by ball bearings.

The counter rotation between the outer supporting means and the driving unit assures good flight stability as well as keeping the cabin or steering means stationary in air space during flight.

According to a preferred embodiment of the invention, the steering means or the cabin is provided with steering flaps. This further improves flight stability.

An improvement in the steering possibilities of the flying craft is achieved by movably positioning two or more of the steering flaps for introduction into the air stream flowing downward between the outer supporting means and the driving unit and by providing at least one stabilizer below the cabin or the steering means.

In this embodiment, the steering flaps can be inserted into the air stream to any given depth, whereby the coefficient of aerodynamic lift can be correspondingly varied. Of course all the steering flaps can be movably arranged for this purpose. By means of the stabilizer, any desired radial position can be adjusted and stabilization backward can be achieved in horizontal flight by means of horizontal approach flow.

In order to secure good steering properties, the steering flaps can be arranged adjustable either jointly or individually and independently. This makes it possible to introduce one or several of the steering flaps, independently of the others, more or less deeply into the air stream. By this, the aerodynamic lift center of the flying craft, which at symmetrical position of the steering flaps is positioned essentially in the axis of rotation of outer supporting means and driving unit, can be adjusted and the flying craft can thus be moved out of its horizontal position. By appropriate adjustment of the steering flaps and optionally of the stabilizer, any given direction of flight in air space, such as climbing, slanting or hovering and the like, can be achieved.

The desired adjustment of the steering flaps can be effected in a simple manner by pivotably positioning the steering flaps on a common frame, preferably a base plate and by articulating, spacially in relation to the axis of rotation of each steering flap, one each connecting or adjusting rod driven by means of a servomotor, a pressure-means-operable working cylinder or the like, these connecting or adjusting rods and/or their associated working cylinders being arranged on a common adjusting body, in particular a rotatably mounted adjusting ring coaxial in relation to the outer supporting means.

In order to allow for the steering flaps to be completely withdrawn from the air stream flowing downward through the annular space between outer supporting means and driving unit, it is practical to provide for the steering flaps to be of segment-like shape and to be arranged, in retracted position, within the surface of projection of the inner periphery of the annular gap formed between outer supporting means and driving unit, preferably within the base plate of the driving unit. It is of advantage in this to arrange the steering flaps essentially in a common, at least approximately horizontal plane below the annular gap formed between outer supporting means and driving unit.

In order to improve the aerodynamic lift of the flying craft according to the invention, it is practical to provide the outer supporting means with a plurality of guide vanes or the like.

By means of said guide vanes or the like, the negative or partial vacuum pressure on the upper side of the outer supporting means and the high pressure on the lower side of the outer supporting means are increased so that the overall aerodynamic lifting force is increased.

In a further development, the guide vanes or the like can be arranged on the upper/or lower side of the outer supporting means preferably within the zone of its outer edge, as an optimum aerodynamic lifting force is achieved in this way.

It is of advantage to provide for the guide vanes or the like to be curved in top plan view onto the outer supporting means. In simple cases, it would of course suffice for the guide vanes to be approximately straight-shaped.

It is further practical to provide for the guide vanes or the like arranged on the upper side of the outer supporting means to be curved in inverse direction in relation to the guide vanes arranged on the lower side of the outer supporting means. It is of advantage to arrange the guide vanes on the lower side of the outer supporting means within the zone below the guide vanes arranged on the upper side of the outer supporting means. But it would also be possible to arrange the guide vanes on the lower side of the outer supporting means radially staggered in relation to the guide vanes arranged on the upper side of the outer supporting means.

It is further of advantage for the guide vanes or the like to be substantially of equal height. But it is of course possible to provide guide vanes of different height.

It is also of advantage that the guide vanes or the like be formed integrally with the outer supporting means. The guide vanes could of course also be separate elements connecting to the other supporting means or could be replaced by ribs or the like.

The invention is explained in detail under reference to the accompanying drawings showing embodiments of the object of the invention.

FIG. 1 shows a view of a first embodiment of the object of the invention partially in section;

FIG. 2 a top plan view of FIG. 1;

FIG. 3 a view of a second embodiment of the flying craft according to the invention partially in section;

FIG. 4 a section along line IV—IV in FIG. 1;

FIG. 5 a representation of FIG. 4 in further detail;

FIG. 6 a diagrammatic view of the steering flaps for a climbing position of the craft;

FIG. 7 a diagrammatic view of the steering flaps for a hovering position of the craft;

FIG. 8 a diagrammatic view of the steering flaps for a horizontal position of the craft;

FIG. 9 a diagrammatic view of the steering flaps for a descent position of the craft;

FIG. 10 a view of a further embodiment of a flying craft according to the invention partially in section along line X—X in FIG. 11 and FIG. 11 a top plan view of FIG. 10.

The flying craft shown in FIGS. 1 and 2 comprises a ring-shaped outer supporting means 1 presenting rotation symmetry having an airfoil profile; the shape of the airfoil profile essentially determining the vertical and horizontal flight properties as well as aerodynamic lift and the properties of gliding. A driving unit 2 such as a propeller engine, turbine or the like is arranged in the axis of rotation of the supporting means 1. The driving unit 2 has a propeller or other rotating driven impeller, and a base which is connected to the supporting means 1 as shown. By means of the counter torque generated by the unit 2, a rotating motion to the outer supporting means is created and thus stabilises it by means of the gyroscopic torque. Air is drawn across the upper side of the outer supporting means and is impelled downwards through the gap which lies between the supporting means 1 and driving unit 2. The aerodynamic lift is determined by revolution control and thrust deflection by means of the steering flaps.

The direction of rotation of the driving unit 2 is shown in FIG. 2 with arrow 3, the counter or opposite rotation of the supporting means 1 is shown in this figure with arrow 4. In the embodiment shown, the number of revolutions of the driving unit 2 amounts to about 10000 min$^{-1}$, while the number of revolutions of the counter-rotating outer supporting means amounts to about 500 min$^{-1}$.

A cabin 5, described generally as a carrier in the claims, is provided with a landing gear or undercarriage 6 is arranged below the outer supporting means 1 and the driving unit 2. The parts 5, 6, which are stationary within air space during flight, are mounted on ball bearings on an axis of rotation 10 to the driving unit 2 and the outer supporting means 1 and tend to rotate with the outer supporting means 1 only via the negligible bearing resistance. In order to be able to counteract this rotational movement and to attain any given position in circumferential direction, steering flaps 8 connected with the cabin 5 are fixed within the air stream. In order to move the flying craft in horizontal direction, it must be moved out of its stable horizontal position. The normal lift symmetrical in respect of rotation can be controlled by means of steering flaps 9 positioned within the air stream or directly in the outer supporting means 1 so that the center of the lift force can be arbitrarily shifted. The cabin is also suitable for taking up ballast.

A fuel tank 7 of plastic material is arranged within the rotating part of the flying craft.

The flying craft shown in FIGS. 3 to 9 comprises a ring-shaped outer supporting means 11 presenting rotation symmetry with an airfoil profile. The shape of the airfoil profile essentially determines the horizontal and vertical flight properties, the aerodynamic lift force and the gliding properties. A driving unit 12 such as a propeller engine, turbine or the like is arranged in the axis of rotation of the supporting means 1 and—as described in detail above—imparts a rotating motion to the supporting means 11 by the counter torque generated by the unit 12 and thus stabilizes the outer supporting means by means of the gyroscopic torque, while at the same time sucking air off the upper side of the supporting means 11 and forcing it downwards.

The rotating direction of the propeller, turbine or the like 12 is shown in FIG. 4 with arrow 13 and the counter-rotating direction of the outer supporting means 11 is shown in this figure with arrow 14.

A steering means 15 provided with a landing gear 16 is arranged below the supporting means 11 and the driving unit 12. The assembly 15, 16, also described as a carrier in the succeeding claims, is stationary within air space during flight is mounted on ball bearings on an axis of rotation to the driving unit and outer supporting means and tends to rotate with the supporting means only via the negligible bearing resistance. The steering means can be replaced or supplemented by a cabin or another means for taking up loads. An annular fuel container 17 is arranged on the driving unit 12.

For steering the flying craft, three steering flaps 21, 22, 23 are arranged symmetrically in relation to the common axis of rotation of supporting means 11 and driving unit 12 and a separate stabilizer 24 is provided. The steering flaps 21, 22, 23 are arranged essentially in a common, at least approximately horizontal plane below the annular gap formed between supporting means 11 and driving unit 12. The stabilizer 24 is arranged below the steering means 15 of the flying craft.

The steering flaps 21, 22, 23 are introduced optionally either jointly or separately and independently of one another into the air stream flowing downward between supporting means 11 and driving unit 12. For this purpose, the steering flaps 21, 22, 23 of segment-like shape are pivotably mounted by means of essentially perpendicular or vertical axes of rotation 26, 27, 28 on a common, circular base plate 25, with one each connecting rod articulated to each steering flap spacially from its axis of rotation. Each connecting rod 29, 30, 31 is actuated by one each servomotor 32, 33, 34, the servomotors being mounted on a common adjusting ring 35 coaxial in relation to the supporting means 11. The adjusting ring 35 is rotatably mounted by means of rollers 36, 37, 38. Due to this arrangement, the steering flaps 21, 22, 23 can be introduced more or less into the air stream flowing downward between supporting means 11 and driving unit 12 by appropriate adjustment of the connecting rods 29, 30, 31. In their retracted position, the steering flaps 21, 22, 23—as shown in broken lines in FIG. 4—can be completely received within the surface of projection of the base plate 25.

The stabilizer 24 is mounted rotatably around an essentially horizontal axis 39 and can also be actuated by means of a servomotor not shown in detail.

FIG. 6 shows the position of the steering flaps 21, 22, 23 and of the stabilizer 24 at climbing. The steering flaps 21, 22, 23 are retracted within the surface of projection of the base plate 25 and the stabilizer 24 is in a vertical position for straight flight.

FIG. 7 shows the position of the steering flaps 21, 22, 23 and of the stabilizer 24 at hovering. The steering flaps 21, 22, 23 are now partially introduced in symmetrical arrangement into the air stream flowing into the annular gap formed between supporting means 11 and driving unit 12, while the stabilizer 24 is again in vertical position for straight flight.

The steering flaps and the stabilizer are normally of plane shape. But they can also be curved and/or provided with projections, recesses or perforations. They can also be arranged inclined in relation to the axis of rotation of the supporting means or driving unit. The axes of rotation of the steering flaps need not be perpendicular, but can be inclined in relation to the horizontal. In top plan view onto the flying craft, the steering flaps can have any given shape such as triangular, trapeze or the like shape.

Figure 1:
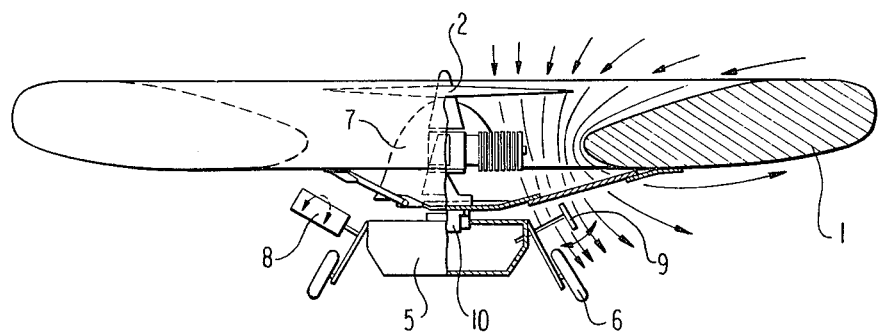
Figure 2:
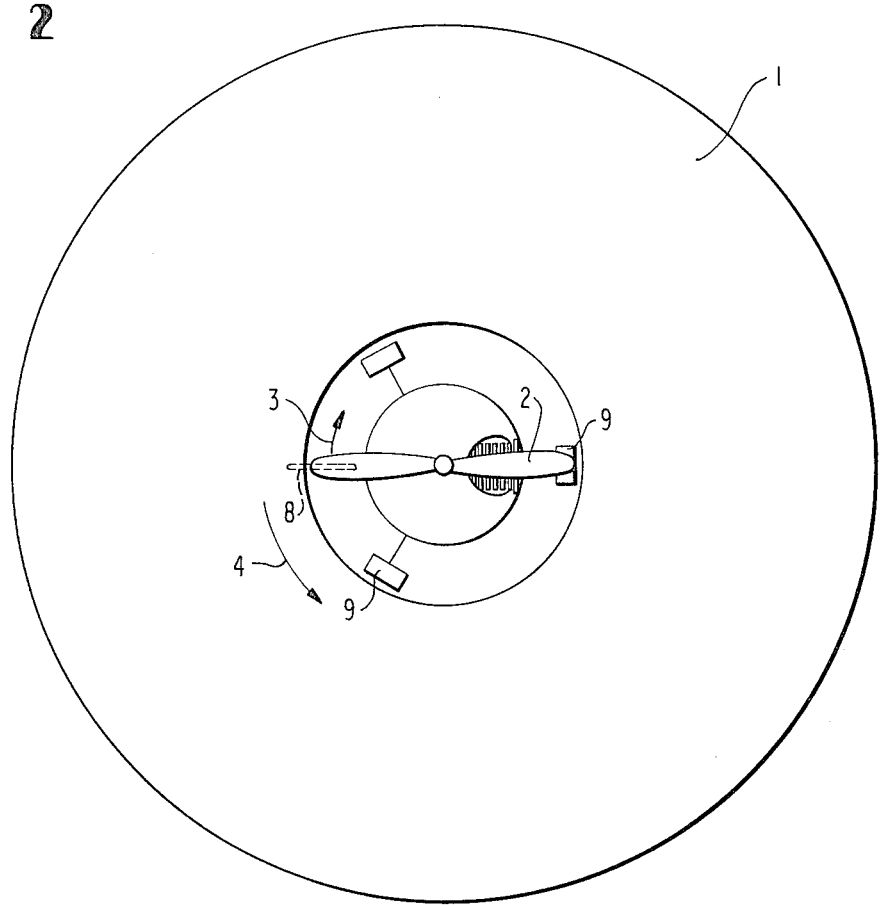
Figure 9:
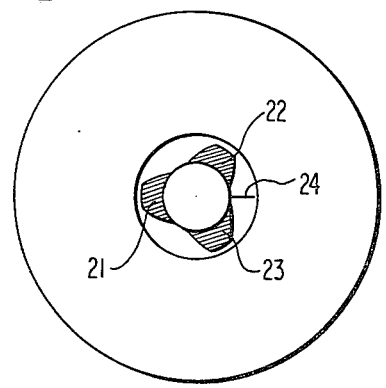
FIG. 9 shows descending flight, with all three steering flaps 21, 22, 23 fully extended symmetrically and protruding into the downward-flowing air stream.
Figure 9:
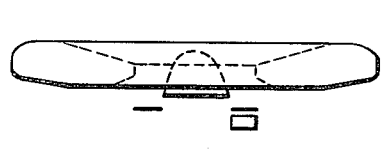
Figure 8:
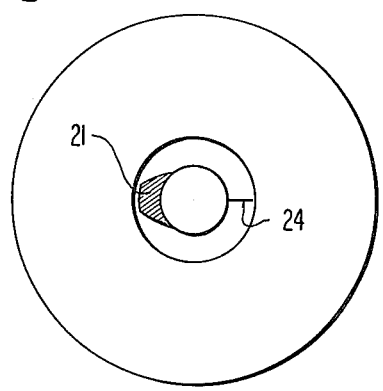
FIG. 8 shows the horizontal control of flight, with the steering flap 21, independently of the steering flaps 22, 23, introduced into the downward-flowing air stream in order to move the flying craft out of its horizontal position.
Figure 8:
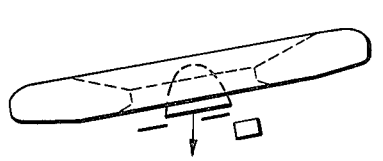
Figure 7:
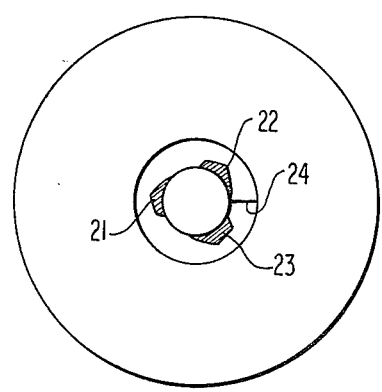
Figure 7:
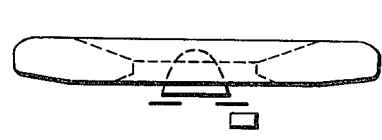
Figure 6:
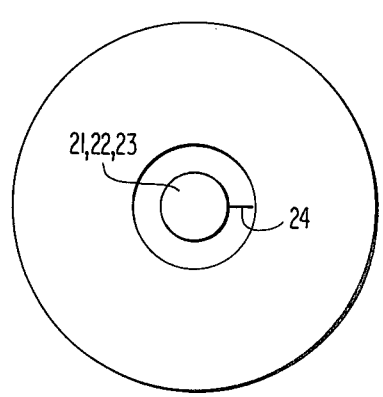
Figure 6:
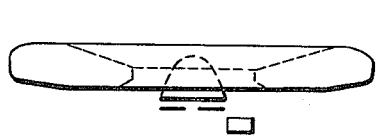
Figure 10:
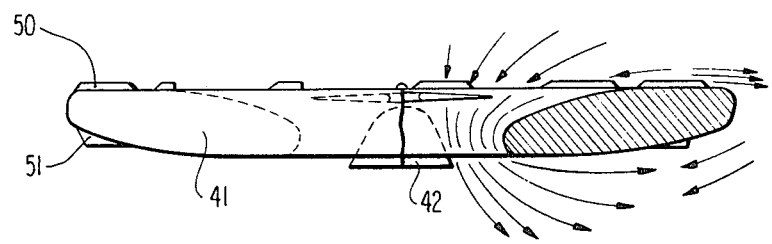
Figure 11:
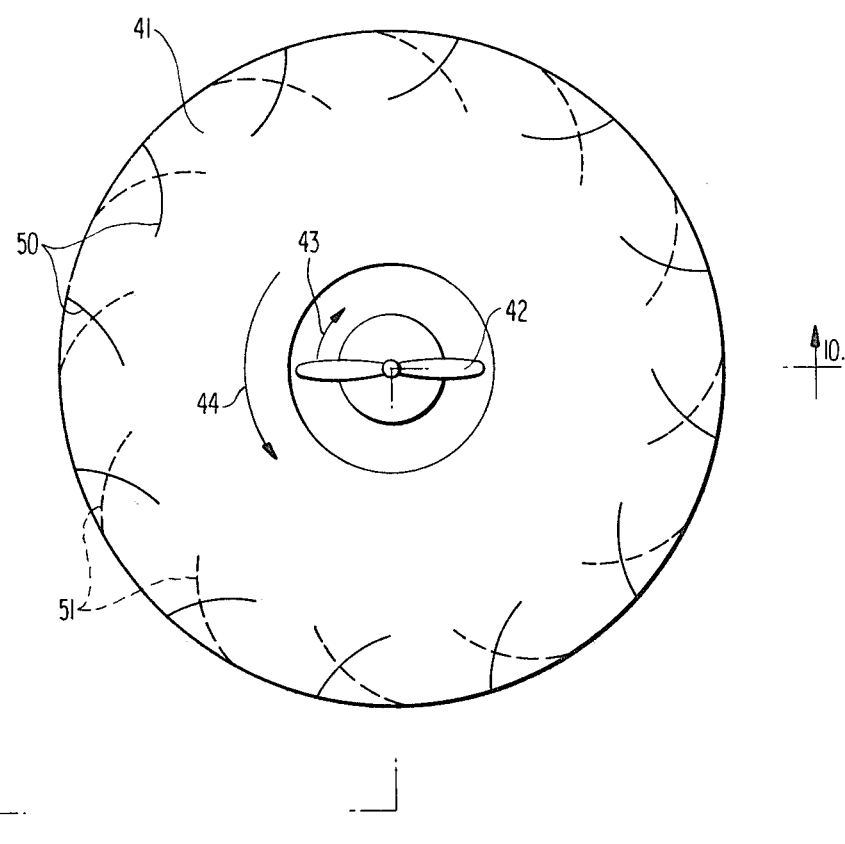

The flying craft shown in FIGS. 10 and 11 comprises outer supporting means 41 presenting rotation symmetry with an airfoil profile, the shape of the airfoil profile essentially determining horizontal and vertical flight properties, aerodynamic lift and gliding properties. A driving unit 42 is mounted in the axis of rotation, which unit 42—as described in detail above—imparts a rotating motion to the supporting means 41 by the counter torque and thus stabilizes it by means of the gyroscopic torque while it sucks air off the upper side of the supporting means 41 and forces the air downward.

The rotating direction of the propeller, turbine or the like is shown in FIG. 11 with arrow 43 and the counter rotation of the supporting means 41 is shown in this figure with arrow 44.

A cabin which is not shown in detail having a landing gear is arranged below the supporting means 41 and the driving unit 42. Cabin and landing gear form an assembly stationary in air space during flight and are mounted on ball bearings on an axis of rotation to driving unit and supporting means and tend to rotate together with the supporting means only via the negligible bearing resistance.

The supporting means 41 is provided with a plurality of guide vanes 50, 51. The guide vanes 50 are arranged on the upper side of the supporting means 41 and the guide vanes 51 are arranged on the lower side of the supporting means 41, each within the zone of the outer edge of same. The guide vanes 50, 51 are of curved shape and the vanes 50 are inversely curved in top plan view onto the supporting means 41 in relation to the vanes 51. The mutual position of the guide vanes is selected so that the guide vanes provided on the lower side of the supporting means 41 are arranged within the zone of the guide vanes provided on the upper side of the supporting means.

The guide vanes 50, 51 are all of equal height and integral with the supporting means 41.

By means of the guide vanes, the negative or partial vacuum pressure on the upper side of the supporting means and the high pressure on the lower side of the supporting means are each increased during flight, thus improving the aerodynamic lift force.

The flying craft shown, of varying dimensions up to two meters diameter or more and various driving units, can attain any desired flying direction in air space and, depending on the respective embodiment, are at present capable or taking up three times their own weight in ballast. At appropriate dimensions of the supporting means in accordance with the driving unit, persons and loads (cargo) can be transported.

What is claimed is:

1. A flying craft comprising a rotationally symmetrical supporting means for creating vertical lift in response to the movement of air over its upper surface, said supporting means having a cross section in the form of an airfoil profile, an inner driving unit coaxially arranged with said supporting means, said driving unit having a rotationally driven impeller portion and a base portion, said base portion being connected to said supporting means so as to rotationally drive the supporting means by the counter torque generated by the driving unit in a direction which is opposite to the rotating direction of the impeller portion, said driving unit being spaced from the supporting means to provide a gap therebetween, said driving unit being oriented and operated to draw air across the upper surface of the supporting means and impelling it downwardly through said gap whereby the movement of air across the upper surface of the supporting means provides said vertical lift, and a carrier, a shaft supported by ball bearings rotatably mounting the carrier in relation to the supporting means and to the driving unit, at least two steering flaps movable into the stream of air flowing through said gap, and at least one stabilizer which is located below the carrier, said steering flaps being pivotally mounted on a common frame, a plurality of rods each of which is associated with one of said flaps and is connected to its respective flap at a point spaced from the pivotal connection between the flap and the frame, a common adjusting ring operatively connected to each of said rods, said adjusting ring being rotatably mounted on and coaxial with the supporting means.

* * * * *